(12) United States Patent
Van Breugel et al.

(10) Patent No.: US 11,128,778 B2
(45) Date of Patent: Sep. 21, 2021

(54) DUPLEX PRINTING METHOD WITH SHRINKAGE COMPENSATION

(71) Applicant: Canon Production Printing Holding B.V., Venlo (NL)

(72) Inventors: Leon C. Van Breugel, Venlo (NL); Henri P. J. Hunnekens, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 17/032,786

(22) Filed: Sep. 25, 2020

(65) Prior Publication Data
US 2021/0014379 A1  Jan. 14, 2021

Related U.S. Application Data

(63) Continuation of application No. PCT/EP2019/057391, filed on Mar. 25, 2019.

(30) Foreign Application Priority Data

Apr. 4, 2018 (EP) ..................... 18165699

(51) Int. Cl.
*G06K 15/02* (2006.01)
*H04N 1/23* (2006.01)
(Continued)

(52) U.S. Cl.
CPC ........ *H04N 1/2323* (2013.01); *B41J 2/04508* (2013.01); *B41J 2/04586* (2013.01);
(Continued)

(58) Field of Classification Search
None
See application file for complete search history.

(56) References Cited

U.S. PATENT DOCUMENTS 8,867,982 B2 * 10/2014 Kojima .............. G03G 15/1605
 399/401
9,162,475 B1  10/2015 Wozniak et al.
(Continued)

FOREIGN PATENT DOCUMENTS

EP   2 693 731 A1   2/2014
JP   2007-79262 A   3/2007

OTHER PUBLICATIONS

International Search Report (PCT/ISA/210) issued in PCT/EP2019/057391, dated May 21, 2019.
(Continued)

*Primary Examiner* — Henok Shiferaw
(74) *Attorney, Agent, or Firm* — Birch, Stewart, Kolasch & Birch, LLP

(57) ABSTRACT

A duplex printing method includes, determining an amount of shrinkage of a media sheet onto which a front side image has been printed; scaling an image to be printed on a back side of the sheet with a scaling function that depends upon the determined shrinkage; and printing the scaled image on the back side of the sheet. The step of determining includes predicting a shrinkage of a media sheet on the basis of process parameters, and on the basis of a model that is defined by a set of model parameters and that describes a dependence of the shrinkage on the process parameters, the process parameters including at least an amount of marking material to be applied to the front side of the sheet; measuring an actual shrinkage of the sheet; and adjusting the model parameters based on a comparison between the predicted shrinkage and the measured shrinkage to improve a prediction of a shrinkage for a subsequent sheet.

7 Claims, 3 Drawing Sheets

(51) Int. Cl.
*B41J 2/045* (2006.01)
*G03G 15/23* (2006.01)
*H04N 1/393* (2006.01)

(52) U.S. Cl.
CPC ......... *G03G 15/235* (2013.01); *H04N 1/2369* (2013.01); *H04N 1/3935* (2013.01)

(56) References Cited

U.S. PATENT DOCUMENTS

| | | | |
|---|---|---|---|
| 9,256,170 B1 * | 2/2016 | Kurita | G03G 15/2017 |
| 2004/0190927 A1 * | 9/2004 | Tsukamoto | G03G 15/234 |
| | | | 399/82 |
| 2010/0128317 A1 | 5/2010 | DeGruchy et al. | |
| 2010/0329756 A1 * | 12/2010 | Mizes | G03G 15/6517 |
| | | | 399/364 |
| 2011/0134178 A1 | 6/2011 | Chiwata | |
| 2014/0037299 A1 * | 2/2014 | Nakura | G03G 15/235 |
| | | | 399/16 |
| 2019/0100041 A1 * | 4/2019 | Clevers | G03G 15/23 |

OTHER PUBLICATIONS

Written Opinion (PCT/ISA/237) issued in PCT/EP2019/057391, dated May 21, 2019.

* cited by examiner

DUPLEX PRINTING METHOD WITH SHRINKAGE COMPENSATION

CROSS REFERENCE TO RELATED APPLICATIONS

This application is a Continuation of PCT International Application No. PCT/EP2019/057391, filed on Mar. 25, 2019, which claims priority under 35 U.S.C. 119(a) to Patent Application No. 18165699.2, filed in Europe on Apr. 4, 2018, all of which are hereby expressly incorporated by reference into the present application.

BACKGROUND OF THE INVENTION

1. Field of the Invention

The invention relates to a duplex printing method comprising, for each duplex copy to be printed, the steps of:
a) determining an amount of shrinkage of a media sheet onto which a front side image has been printed;
b) scaling an image to be printed on a back side of the sheet with a scaling function that depends upon an expected shrinkage of the media sheet; and
c) printing the scaled image on the back side of the sheet.

2. Description of the Related Art

In duplex printing, it is usually desired that the front side and back side images are in registry with one another. However, when the front side image has been printed, the sheet may undergo a certain shrinkage, the amount of which depends upon the print process. For example, in an ink jet process, the sheet will become wetted with ink, and a subsequent step of curing the ink by heating the sheet or irradiating it with UV light, for example, usually causes the sheet to shrink to some extent, either isotropically or anisotropically, depending upon the physical properties of the media. The amount of shrinkage also depends critically upon the amount of ink that has been applied to the sheet in order to form the front side image. Similarly, in an electrostatic print process, the step of fusing a toner image may also lead to a shrinkage that depends upon the amount of toner that has been applied, on the fuse temperature and the like.

Consequently, when the sheet is recirculated through the duplex loop of the printer and is fed to the print station once again in order to print the back side image, the front side image will have shrunk together with the media sheet, and even if the dimensions of the front side and back side images have initially been equal, the front/back registration will be lost.

In order to compensate for this effect, it has been known to estimate or measure the amount of shrinkage after the front side printing step and then to scale the image to be printed on the back side in accordance with the shrinkage, such as described in the Japanese patent application JP2007/79262. It is also known, that the amount of shrinkage varies with the amount of ink that is deposited on the front side of the media sheet during the printing process, as described in US patent application US2011/0134178. In European patent application EP2693731, it is described to use a determined shrinkage or expansion ratio for a first recording medium to correct image data for a second recording medium.

However, when the amount of shrinkage is estimated on the basis of known properties of the media sheets and possibly on the basis of the known amount of ink to be applied, the achievable accuracy will generally be poor.

Moreover, it is cumbersome to adapt the algorithm for determining the expected shrinkage to varying conditions under which the print process is carried out.

On the other hand, if the actual amount of shrinkage is measured, the measurement should be carried out as shortly as possible before the step of printing the back side image, because otherwise the measured shrinkage would not reflect the amount of further shrinkage that has occurred after the measurement until the sheet finally reaches the print station. However, since the scaling of the image requires a time-consuming raster image processing operation, there is an inevitable delay between the time of measurement and the start of the print process, so that the productivity is degraded.

It is therefore an object of the invention to provide a method of duplex printing which permits both a high accuracy in shrinkage compensation and a high productivity.

SUMMARY OF THE INVENTION

In order to achieve this object, in the method according to the invention, the step a) comprises the steps of:
a1) predicting an expected shrinkage of the media sheet on the basis of process parameters that characterize a process of printing the front side image and on the basis of a model that is defined by a set of model parameters and describes a dependence of the shrinkage on the process parameters, said process parameters including at least an amount of marking material to be applied to the front side of the sheet during printing;
a2) measuring an actual shrinkage of the sheet; and
a3) adjusting the model parameters (M, M') based on a comparison between the predicted shrinkage (S) and the actual shrinkage (A) to improve a prediction of an expected shrinkage of a subsequent sheet, wherein the step a3) comprises a statistical analysis of predicted and actual shrinkages (S, A) of a number of previously processed sheets.

In this method, a high productivity can be achieved because the scaling of the back side image can be based on the predicted shrinkage, so that the scaling and raster image processing can start early. Nevertheless, a high accuracy can be achieved because the steps of measuring the actual shrinkage and adapting the model parameters permit to continuously improve the model and thereby to improve the accuracy in predicting the shrinkage.

The method has the further advantage that the model for predicting the shrinkage may automatically adapt to varying process parameters such as ambient temperature and ambient humidity and possibly also to varying properties of the media sheets being processed.

More specific, optional features of the invention are indicated in the dependent claims.

Several algorithms are available for adjusting the model parameters on the basis of the past deviations between predicted and measured shrinkages. For example, an "evolutionary" approach may be used wherein the model parameters are varied randomly and the varied parameters are maintained if they have led to an improved prediction and, if the prediction accuracy has decreased, the variations are rejected and the previous parameters are restored.

The adjustment of the parameters may involve a statistical analysis of a certain number of iterations of the prediction and measurement steps for successive media sheets. For example, the statistical analysis may involve a (weighted) moving average, or a least-squares optimization, and the like.

Although the model may adapt automatically to different properties of different media types, it may be advantageous to start with an initial model that has been specifically selected in view of the media type, whenever the media type changes. In case of print jobs with mixed media, several models, one for each media type, may be used in parallel, and the models may be optimized based on separate statistics for each media type.

In general, the iterative optimization process will lead to a gradual convergence of the model parameters to be optimal model parameters, as long as the process parameters (at least the parameters other than the amount of ink) are relatively stable. If a high accuracy is required even at the start of an iteration sequence, it may even be considered to employ a hybrid printing method in which, for the first view sheets, the shrinkage is measured and the scaling of the back side image is based on the measured shrinkage, which of course reduces the productivity, and the scaling is based on the predicted shrinkage only after a certain time, when the self-learning process has led to some improvement in the model parameters.

BRIEF DESCRIPTION OF THE DRAWINGS

Embodiment examples will now be described in conjunction with the drawings, wherein.

DETAILED DESCRIPTION OF EMBODIMENTS

Figure 1:
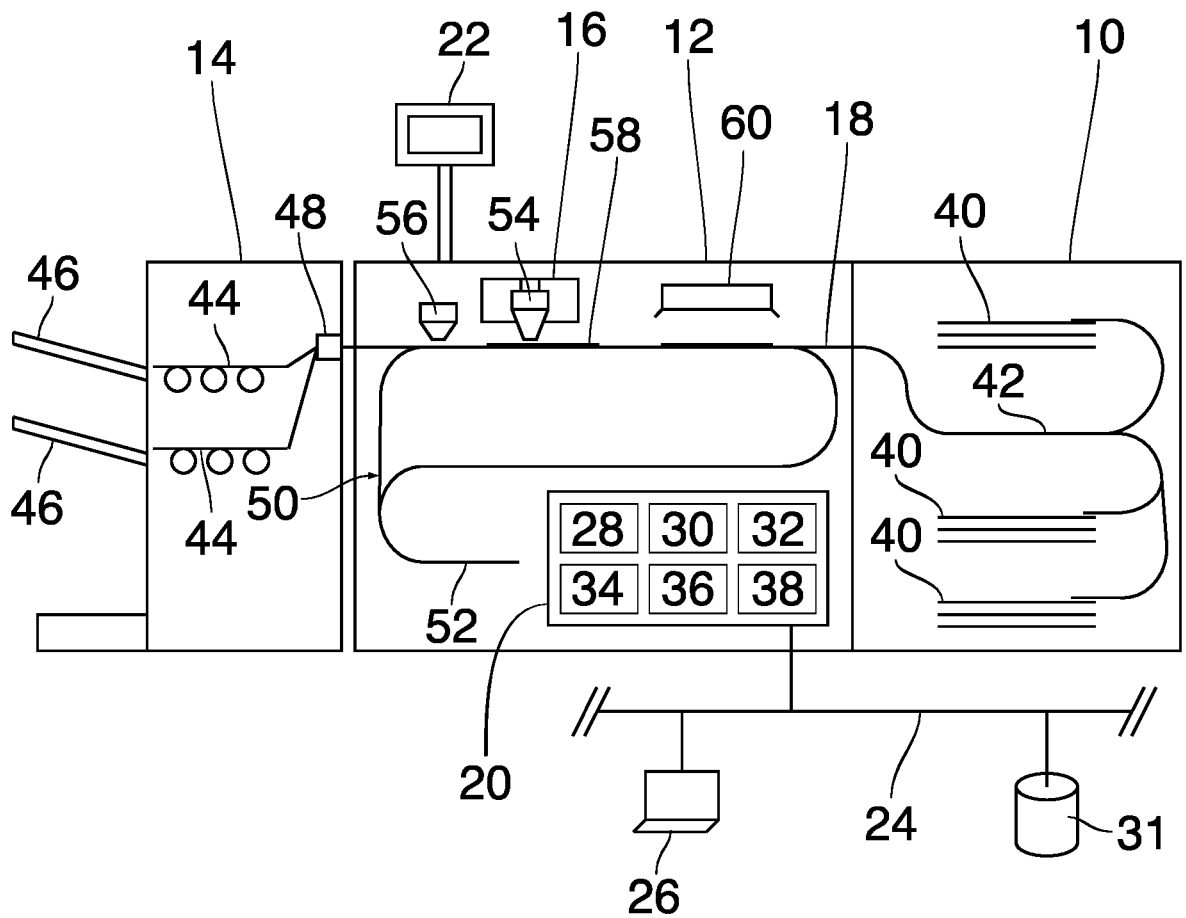
FIG. 1 is a schematic view of a printer to which the invention is applicable.

As is shown in FIG. 1, a printer comprises an input section 10, a main body 12, and an output section 14. The main body 12 comprises a print station 16, a sheet supply system including a sheet transport path 18, an electronic controller 20 and a user interface 22.

The controller 20 may be formed by a computer, a server or a workstation and is connected to all the functional components of the printer for controlling the same and is further connected to the user interface 22 and to a network 24 via which the controller may communicate with a remote workstation 26 of a user or operator. In an alternative embodiment, the controller 20 may also be installed outside of the main body 12 for controlling the various system components via the network 24.

The hardware and/or the software of the controller 20 includes among others a print job receiving section 28, a scheduler 30, a feed control section 32, a print control section 34, an output control section 36, and a sheet manager 38. The print job receiving section 28 is arranged to receive, e.g. via the network 24, print jobs each of which includes image data for one or more pages to be printed as well as various job settings. Optionally, the image data may also be received from a local scanner, whereas the job settings are input at the user interface 22. The job settings include among others instructions that specify, for each image to be printed, the properties or type of a recording medium on which the image shall be printed.

The input section 10 includes a plurality of holders 40 each of which accommodates a supply, e.g. a stack, of media sheets of a certain media type. The media types in the different holders 40 may differ in sheet thickness, sheet material, surface properties of the sheets, cut direction and the like. The input section 10 further includes a feed mechanism 42 arranged to separate individual sheets from a selected one of the holders 40 and to supply them one by one into the sheet transport path 18 under the control of the feed control section 32.

When the job receiving section 28 has received a print job, the scheduler 30 determines a sequence in which the images of this print job shall be printed. The scheduler 30 further has access to a database 31 that stores the media types and properties of the sheets accommodated in the various holders 40. Based on the job settings that concern the media properties, the scheduler 30 selects the holders 40 from which the sheets with the desired properties are to be taken and determines a sequence in which the sheets of the different media types are to be fed into the sheet transport path 18 such that the sequence of sheets matches the sequence of images to be printed.

When the print process has been started, the feed control section 32 controls the feed mechanism 42 to supply the sheets in the sequence as scheduled into the sheet transport path 18, and the print control section 34 controls the print station 16 so as to print a corresponding image on the top side of each sheet.

In the example shown, the output section 14 has a plurality of holders 44 on which the sheets may be stacked after they have left the print station 16. When a stack, which may for example comprise a set of sheets forming a complete copy of a multi-page document, has been completed, the holder 44 will forward the stack onto an associated output tray 46. In an alternative embodiment the completed stacks may also be forwarded to a finisher (not shown) for performing finishing operation such as stapling, punching and the like.

The output section 14 further includes a switch 48 which is controlled by the output control section 36 for directing each sheet to a designated one of the holders 44.

The main body 12 of the printing section includes a duplex path 50 which branches off from the sheet transport path 18 downstream of the print station 16, reverses the orientation of the sheets in a sheet reversing mechanism 52 and then returns the sheets upside down to the entry side of the sheet transport path 18.

It shall further be assumed in this example that the print station 16 includes as print engine an ink jet print head 54 that is disposed above the sheet transport path 18. A curing station 56, constituted for example by curing lamps, is disposed downstream of the print station 16. The duplex loop 50 branches off from the sheet transport path 18 downstream of the curing station 56, so that sheets 58 on which a front side image has been printed in the print station 16 will undergo a curing process before they are recirculated through the duplex loop 50.

Dependent upon the amount of ink that is applied to the sheet 58 in order to form the front side image, the sheet will be wetted to some extent, and the radiation and heat applied in the curing station 56 may cause a certain shrinkage of the sheet. In order to assure an exact front/back registration of the front side image with a back side image to be formed later on the back side of the sheet, the shrinkage should be taken into account by appropriately scaling the back side image in a step of raster image processing for the back side image. A scanner 60 is disposed immediately upstream of the print station 16 for measuring the dimensions of each sheet that returns from the duplex loop, and thereby to measure the shrinkage of the sheet.

Figure 2:
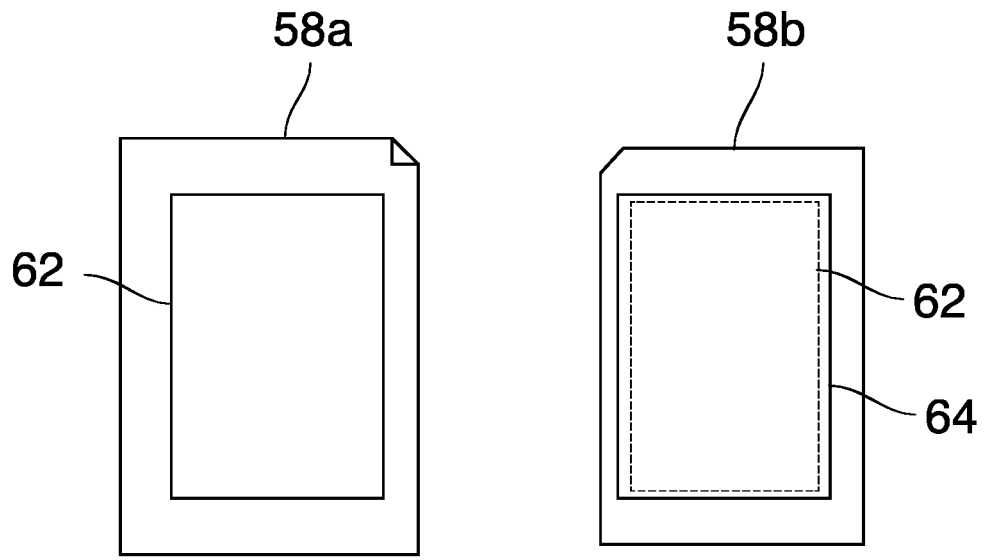
FIG. 2 illustrates the effect of media shrinkage on the front/back registration of the printed images.

The effect of media shrinkage on the front/back registration of the front side and back side images has been illustrated in FIG. 2, which shows a front side view 58a of a media sheet with a front side image 62 printed thereon. FIG. 2 further shows a back side view 58b of the same media sheet, i.e. a view of the sheet in the state in which it has returned from the duplex loop 50 and fed to the print station 16 once again for printing a back side image 64.

As has been shown exaggeratedly in FIG. 2, the media sheet has undergone a certain (possibly anisotropic) shrinkage in the process of printing and curing the front side image 62. This shrinkage has affected not only the outer contour of the media sheet but also the front side image 62 which has been shown in phantom lines in the back side view 58b. It can be seen that the contour of the shrunk front side image 62 deviates from the contour of the back side image 62, which means that the front/back registration has been lost.

In order to compensate for this effect, the print control section 34, when raster image processing the back image 64, must scale the back side image with scaling factors for each direction such that the contour of the back side image 64, when printed, coincides again with the shrunk contour of the front side image 62.

The scaling factors to be applied to the back side image 64 could be based on the measurement results obtained from the scanner 60. However, since the scaling operation (embedded in the raster image processing) takes some time, this would lead to a delay in the print process because the print processing in station 16 can only start when raster image processing has been completed. In principle, this delay could be avoided by positioning the scanner 62 further upstream of the print station 16. Then, however, a further shrinkage of the sheet on its way from the scanner 62 to the print station 16 could not be taken into account, so that an accurate compensation would not be possible.

For this reason, in the method according to the invention, the shrinkage of the media sheet after printing of the front side image 62 is predicted by means of a mathematical model, and the scanner 62 is used only for checking whether the prediction provided by the modal is correct and, if not, for improving the model by appropriately adapting the model parameters. The improved model is not available for the sheet that is currently being fed to the print station 16, but it will be available and can be used for other, further media sheets that will be printed later, so that, in the long run, an accurate shrinkage compensation can be achieved.

Figure 3:
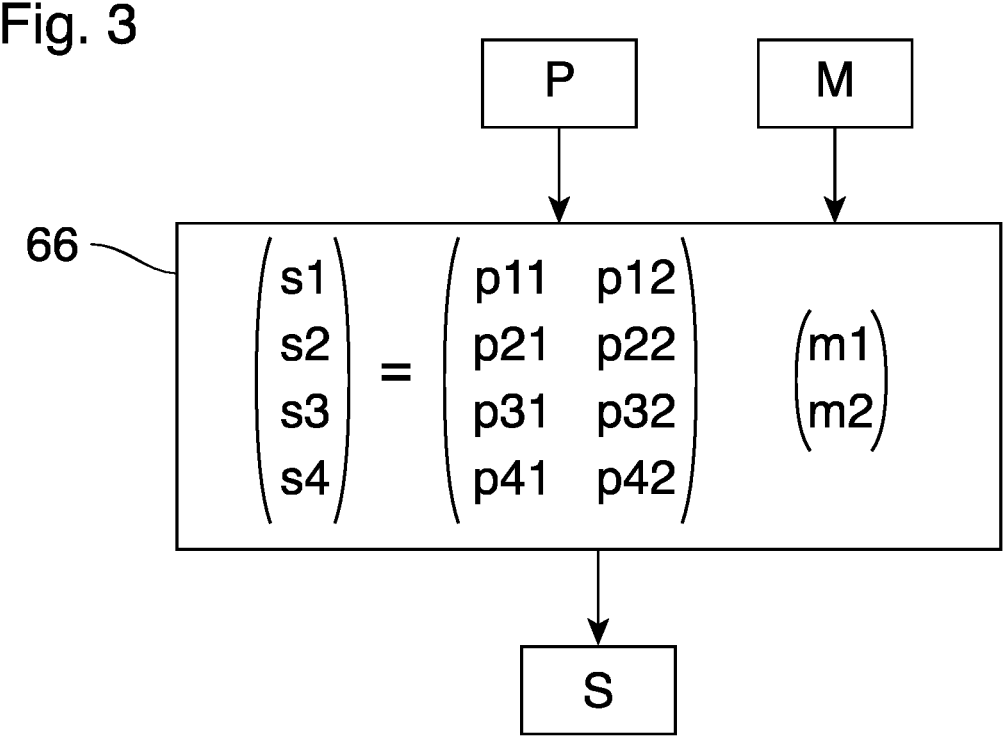
FIG. 3 is a diagram illustrating a model for predicting media shrinkage.

A simplified example of a model 66 (a linear model in this example) for predicting shrinkages s1-s4 has been shown in FIG. 3. The model 66 is defined by model parameters M and receives process parameters P. The model parameters M define the structure of the model and, in this simplified example, take the form of a two-dimensional vector (1×2 matrix) with components m1 and m2. The process parameters P represent the physical properties of the print process that leads to the media shrinkage, i.e. the process of printing and curing the front side image 62. The process parameters P include in any case the amount of ink that has been applied to the media sheet in order to form the front side image 62 and may further include other parameters that specify one or more of the following properties and conditions of the print process:

media type (distinguished by media size and brand name, material, weight per area and the like of the media;
temperature at which the sheet is dried (cured);
transport speed of the sheet (impacting the time the sheet resides in the curing station 56 and the time between printing the front side image and printing the back side image);
ambient temperature and humidity;
internal temperature and humidity in the input section 10;
sheet orientation (LEF or SEF), having an impact on fiber orientation and anisotropic shrinkage).

Among these process parameters, the amount of ink will generally be the parameter that varies most dynamically (typically from sheet to sheet), whereas the other process parameters (possibly with the exception of the media type in case of mixed media printing) will vary at a significantly slower rate.

In general, the shrinkage of a media sheet will be defined by two shrinkage factors, one for the long edge direction and one for the short edge direction of the sheet. For simplicity, however, only one shrinkage factor has been considered in the FIG. 3. The four different shrinkage factors s1-s4 shown in FIG. 3 relate to the same shrinkage direction but indicate the predicted shrinkages of four successive media sheets. These four shrinkage factors can be considered as a four-dimensional vector S.

Accordingly, the process parameters P comprise pairs (p11, p12); (p21, p22); . . . of parameters for each of the four print operations that give raise to the shrinkages s1-s4. Thus, the process parameters P form a 2×4 matrix in this example.

According to the linear model considered here, the shrinkage vector S is given by the matrix product P*M. In a more general case, the process parameters may form a k×n matrix and the model parameters may form a k-dimensional vector.

Figure 4:
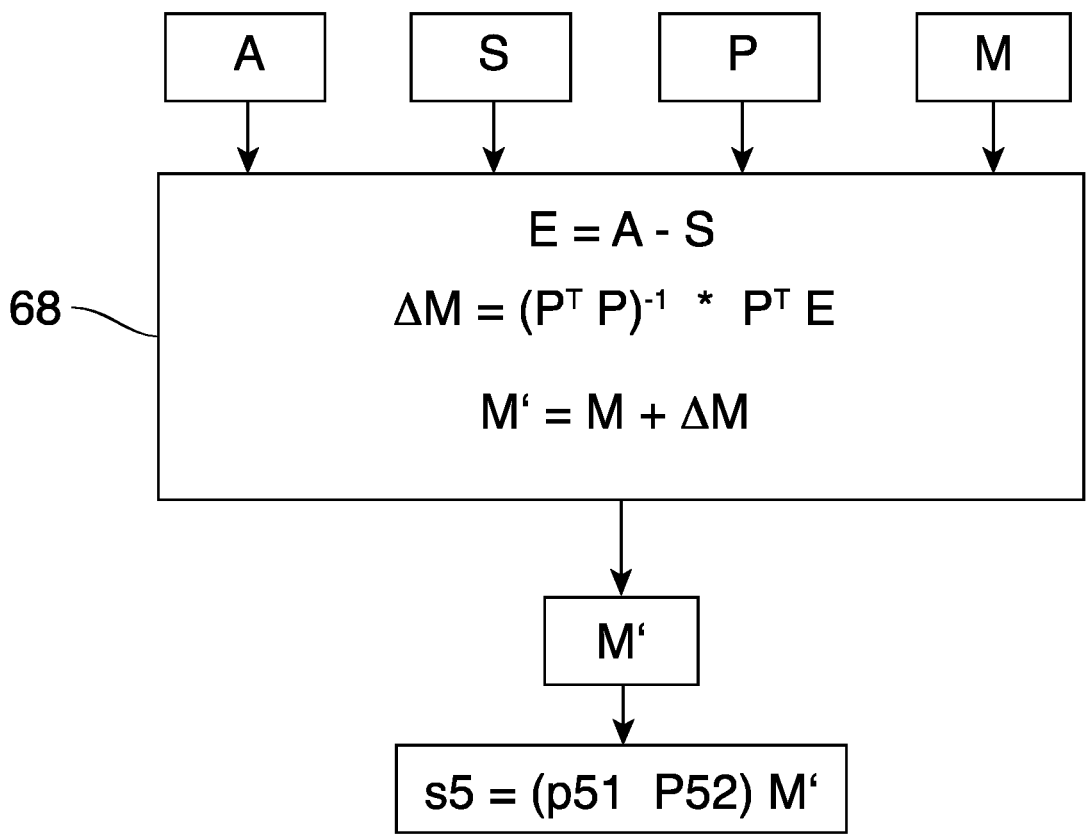
FIG. 4 is a diagram illustrating an iterative self-learning process for improving the model shown in FIG. 3.

The dimension n (=4 in this example) of the shrinkage vector S is the so-called optimization horizon which determines how many sheets are taken as input for an iteration step that has been illustrated in FIG. 4 and serves for optimizing the model parameters M.

As is shown in FIG. 4, an iteration step 68 has as its input the model parameters M, the process parameters P for the last n sheets, the shrinkage vector S, i.e. the predicted shrinkage values s1 . . . sn, and another n-dimensional vector A which represents the actual shrinkages as measured by the scanner 60 for the last n sheets. The output of the iteration step 68 is an adjusted set of model parameters M'.

In this example, the iteration step 68 is a step of a least-squares optimization. Thus, M' is given by a sum M+ΔM, wherein ΔM is a k-dimensional vector obtained by multiplying the k×k matrix $(P^T P)^{-1}$ with the k-dimensional vector $P^T E$, E being the n-dimensional vector A minus S. $P^T$ is the transposed of the k×n matrix P, i.e. a n×k matrix, and $(P^T P)^{-1}$ is the matrix obtained by inverting the matrix product $P^T P$.

As is further shown in FIG. 4, the modified model parameters M' are then utilized for predicting a shrinkage s5 of a further sheet. Just as the shrinkages s1-s4 in FIG. 3, the predicted shrinkage S5 is a scaler product of a line of the matrix P and a vector formed by model parameters, with the only difference that the adjusted model parameters M' are used in place of the former model parameters M.

When a subsequent sheet, for which the model 66 with the model parameters M' yields a predicted shrinkage s5, has been conveyed through the duplex loop 50 and is measured at the scanner 60 so as to obtain the actual shrinkage of that sheet, a further iteration step corresponding to FIG. 4 can be performed, utilizing as input an updated shrinkage vector S with the components s2-s5, the corresponding vector A of the actual shrinkages, the pairs of process parameters (p21, p22)-(p51, p52), and the adjusted model parameters M'. It will be understood that (p51, p52) are the process parameters that apply to the process of printing the front side image for the current sheet (resulting in the shrinkage s5).

Figure 5:
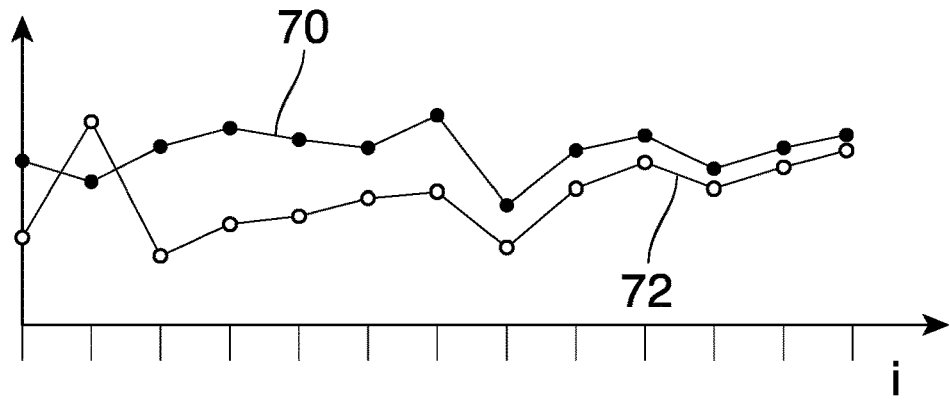
FIG. 5 is a graph showing a gradual convergence of predicted and measured shrinkages over several iterations of the optimizing step shown in FIG. 4.

This iteration step will then lead to another adjusted set of model parameters. In this way, a new set of model parameters M, M', ... is obtained in each iteration step, and each new set of model parameters takes into a count the latest deviations between the predicted and measured shrinkages. The model parameters will gradually approach an optimal set of model parameters which makes the predicted shrinkages essentially equal to the measured actual shrinkages. An example of such an optimization process has been illustrated in FIG. 5, where an index i counts the number of iteration steps (corresponding to FIG. 4), a curve 70 indicates the measured actual shrinkages of the respective last sheet in each iteration step, and the curve 72 indicates the corresponding predicted shrinkages.

It can be seen that, although the shrinkages fluctuate from iteration to iteration (mainly because of the different amounts of ink applied to the sheets), the predicted shrinkages generally tend to converge towards the actual shrinkages. This means that the accuracy of the shrinkage compensation is continuously improved.

Figure 6:
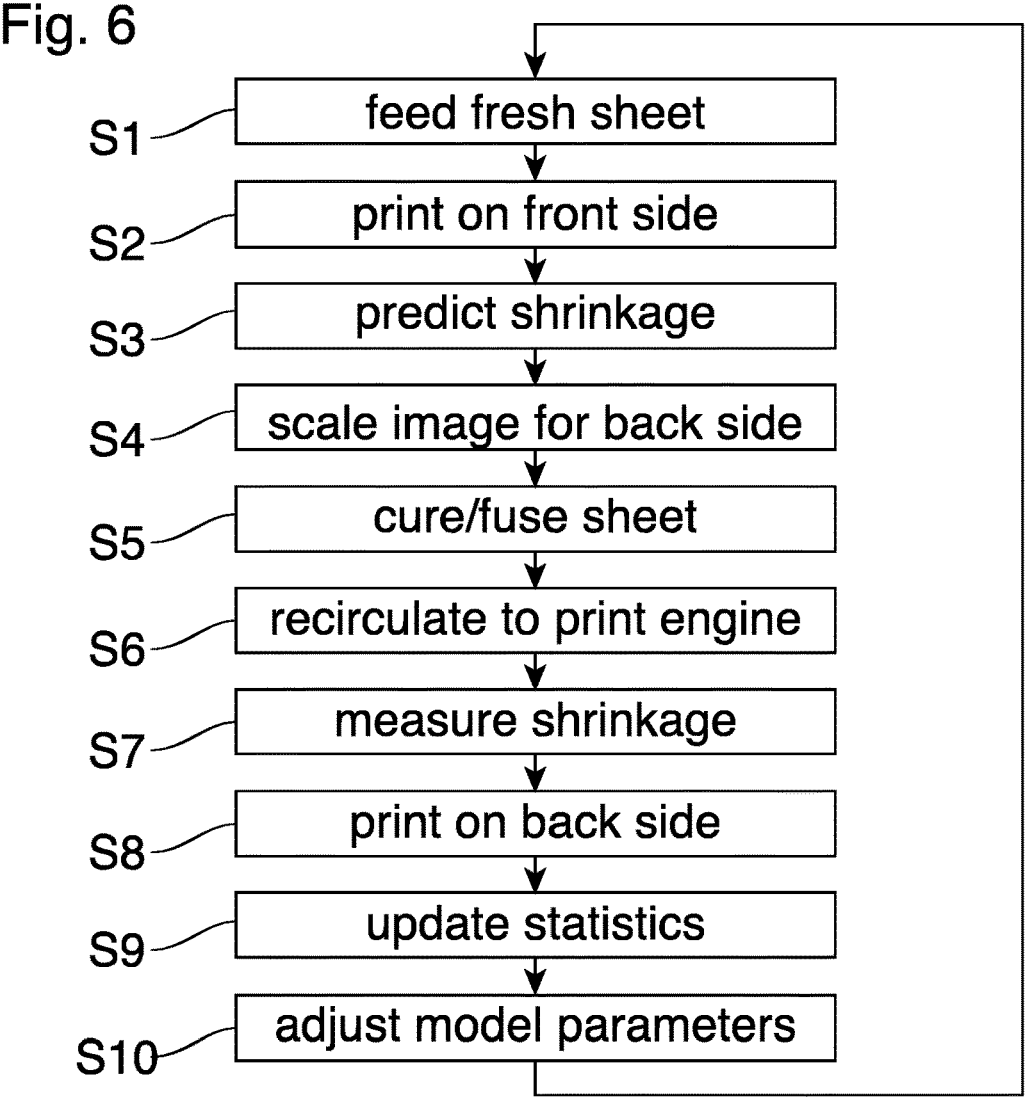
FIG. 6 is a flow diagram illustrating essential steps of a method according to the invention.

In FIG. 6, the essential steps of the method according to the invention have been summarized in a flow diagram A fresh media sheet 58 is fed to the print station 16 in step S1, and a front side image is printed on that sheet in step S2. Then, the shrinkage (possibly two shrinkage factors for the two edge directions) is predicted in step S3 on the basis of the model 66 as has been explained in FIGS. 3 and 4, and the back side image 64 is scaled in accordance with the predicted shrinkage in step S4. It will be observed that the step S4 may take some time but can be started so early that the result will be available when sheet has passed through the duplex loop 50 and reaches the print station 16 again.

Meanwhile, the sheet with the front side image 62 applied thereon is cured in the curing station 56 (step S5). Equivalently, if the print process is an electrostatic or magnetostatic print process rather than an ink jet process, the front side toner image will be fused in step S5, and the process parameters P will represent the amount of toner and other parameters of the electrostatic or magnetostatic process such as the fuse temperature and the like.

In step S6, the sheet is recirculated through the duplex loop 50 to the print engine 16, and then the scanner 60 is used to measure the actual shrinkage of that sheet in step S7. Then, in step S8, the back side image 64 is printed, using the scaled image data that have been obtained in step S4.

The measured shrinkage is also used for updating the statistics, i.e. the shrinkage vector S shown in FIG. 3 (step S9), whereupon the model parameters M are adjusted as has been shown in FIG. 4. Then, the method loops back to step S1, and the process is iterated for each new duplex sheet to be printed.

The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A duplex printing method comprising, for each duplex copy to be printed, the steps of:
    a) determining an amount of shrinkage of a media sheet onto which a front side image has been printed;
    b) scaling an image to be printed on a back side of the sheet with a scaling function that depends upon an expected shrinkage of the media sheet; and
    c) printing the scaled image on the back side of the media sheet, wherein the step a) comprises steps of:
        a1) predicting an expected shrinkage of the media sheet on the basis of process parameters that characterize the process of printing the front side image, and on the basis of a model that is defined by a set of model parameters and that describes a dependence of the shrinkage on the process parameters, said process parameters including at least an amount of marking material to be applied to the front side of the sheet during printing;
        a2) measuring an actual shrinkage of the sheet; and
        a3) adjusting the model parameters based on a comparison between the predicted shrinkage and the actual shrinkage to improve a prediction of an expected shrinkage of a subsequent sheet,
    wherein the step a3) comprises a statistical analysis of predicted and actual shrinkages of a number of previously processed sheets.

2. The method according to claim 1, wherein the step c) is a step of ink jet printing.

3. The method according to claim 1, wherein the process parameters include at least one parameter defining physical properties of the media sheet.

4. The method according to claim 1, wherein the step a3) comprises a least-squares optimization of the model parameters on the basis of the predicted and actual shrinkages.

5. A duplex printer comprising:
    a print station;
    a duplex loop for recirculating sheets bearing a front side image back to the print station for printing a back side image;
    a sensor for measuring a shrinkage of sheets returning from the duplex loop; and
    a controller controlling the operation of the printer, wherein the controller is configured to perform the method according to claim 1.

6. The duplex printer according to claim 5, wherein the sensor is arranged immediately upstream of the print station.

7. A machine-readable non-transitory medium comprising program code, that, when loaded into a controller of a printer causes the controller to perform the method according to claim 1.

* * * * *